US 8,643,599 B2

(12) United States Patent
Lane

(10) Patent No.: US 8,643,599 B2
(45) Date of Patent: Feb. 4, 2014

(54) WASHABLE MOUSE

(75) Inventor: David M. Lane, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1607 days.

(21) Appl. No.: 11/426,828

(22) Filed: Jun. 27, 2006

(65) Prior Publication Data
US 2007/0296700 A1 Dec. 27, 2007

(51) Int. Cl.
G06F 3/033 (2013.01)

(52) U.S. Cl.
USPC .......................................... 345/163; 345/166

(58) Field of Classification Search
USPC .................................. 345/163–166
See application file for complete search history.

(56) References Cited

U.S. PATENT DOCUMENTS

| 4,258,970 | A | * | 3/1981 | Bourdon et al. | 439/149 |
|---|---|---|---|---|---|
| 5,340,955 | A | * | 8/1994 | Calvillo et al. | 200/302.2 |
| 5,508,719 | A | * | 4/1996 | Gervais | 345/157 |
| 5,572,205 | A | * | 11/1996 | Caldwell et al. | 341/33 |
| 5,818,422 | A | * | 10/1998 | Kwon | 345/157 |
| 6,219,038 | B1 | * | 4/2001 | Cho | 345/173 |
| 6,239,391 | B1 | | 5/2001 | Nishijima et al. | |
| 6,304,249 | B1 | * | 10/2001 | Derocher et al. | 345/163 |
| 6,469,694 | B1 | | 10/2002 | Mikan | |
| 6,542,355 | B1 | | 4/2003 | Huang | |
| 6,666,926 | B2 | | 12/2003 | Naghi et al. | |
| 6,801,967 | B2 | * | 10/2004 | Nakamura et al. | 710/62 |
| 6,852,170 | B1 | | 2/2005 | Williams | |
| 6,871,138 | B1 | | 3/2005 | Minelli | |
| 7,336,259 | B2 | * | 2/2008 | Li et al. | 345/163 |
| 2002/0097225 | A1 | * | 7/2002 | Muranami | 345/166 |
| 2003/0160763 | A1 | * | 8/2003 | Cheng et al. | 345/163 |
| 2004/0119692 | A1 | * | 6/2004 | Liang | 345/163 |
| 2005/0031147 | A1 | | 2/2005 | Viala | |
| 2005/0052410 | A1 | | 3/2005 | Chen | |
| 2005/0190154 | A1 | * | 9/2005 | Kuo | 345/163 |
| 2006/0011458 | A1 | | 1/2006 | Purcocks | |
| 2006/0227108 | A1 | * | 10/2006 | Meyer et al. | 345/163 |

(Continued)

FOREIGN PATENT DOCUMENTS

GB 2 338 188 A 12/1999

OTHER PUBLICATIONS

AquaPoint Waterproof Optical Mouse "MOBILEWHACK," http://www.mobilewhack.com/computers/review/aquapoint_waterproof_optical_mouse.html, printed Apr. 18, 2006.

(Continued)

Primary Examiner — Alexander Eisen
Assistant Examiner — Nelson Lam
(74) Attorney, Agent, or Firm — Merchant & Gould

(57) ABSTRACT

Embodiments of a washable computer mouse are disclosed. In an embodiment, a water impermeable layer is sealably mounted to a housing so as to provide a water impermeable region and a water permeable region. Mouse circuitry, which includes a sensor and a light source and a responsive element, is positioned in the water impermeable region. A biased button is positioned in the water permeable region and is configured to engage the responsive element. In an embodiment, the mouse circuitry may be configured for wireless transmission of signals and may include a removable door that, in operation, sealably covers a replaceable power source. In an alternative embodiment, the housing may include an exposed connector and a plug that is configured to seal the connector may be attached to the housing by a tether.

17 Claims, 8 Drawing Sheets

(56) References Cited

U.S. PATENT DOCUMENTS

| | | |
|---|---|---|
| 2007/0152967 A1* | 7/2007 | Ping ............................... 345/163 |
| 2008/0231598 A1* | 9/2008 | Purcocks ....................... 345/163 |
| 2009/0073123 A1* | 3/2009 | Raz et al. ....................... 345/166 |

OTHER PUBLICATIONS

Rugged Technologies Inc., "Medical and Industrial Keyboards: Solutions for Contamination Control," http://ruggedtech.com, printed Apr. 18, 2006.

Stealth Computer Corporation, "Industrial Pointing Devices, Trackballs & Mice," http://www.stelthcomputer.com/peripherals_industpoint.htm, printed Apr. 18, 2006.

ThePodcastNetwork, "Washable Computer Mice Stop The Spread Of Infection," http://health.thepodcastnetwork.com/2006/02, Feb. 28, 2006.

Medical News Today, "Washable Computer Mice Stop The Spread Of Infection," http://www.medicalnewstoday.com/medicalnews.php?newsid=38476, Feb. 28, 2006.

* cited by examiner

WASHABLE MOUSE

BACKGROUND

Input devices, such as computer mice, are highly useful for interfacing with a computer. One potential issue with the use of a computer mouse, however, is that users touch it. This physical contact tends to spread germs from user to subsequent user. This can lead to the spread of sickness and malaise and is especially concerning in public areas such as libraries and internet cafes where multiple users use a single computer.

In addition, a mouse can be come dirty due to a user's sweat, as well as exposure to dirt and food or drink. Therefore, the computer mouse has a substantial tendency to become dirty and unsanitary over a period of use. Given the expected usage patterns, high levels of bacteria and germs, as well as dirt and other undesirable deposits, can be expected to be found on a computer mouse. While designs exist to help combat the problem with potentially unsanitary computer mice, further improvements would be helpful.

SUMMARY

A housing is provided with a mouse circuitry that includes a light source, a sensor and a responsive element. An optical port is provided in the housing. A barrier layer is sealed to the housing so as to form a sealed pocket around the mouse circuitry. A button is mounted outside the sealed pocket and is configured to actuate the responsive element through the barrier layer. The mouse circuitry may be configured for wireless communication with an external device. The housing may include an exposed external connector and may further include a plug for removably sealing the external connector. A sealed touchpad unit may be mounted near the button and may be in sealed communication with mouse circuitry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Aspects of the invention are illustrated by way of example and not limited in the accompanying figures in which like reference numerals indicate similar elements and in which.

DETAILED DESCRIPTION

Figure 1:
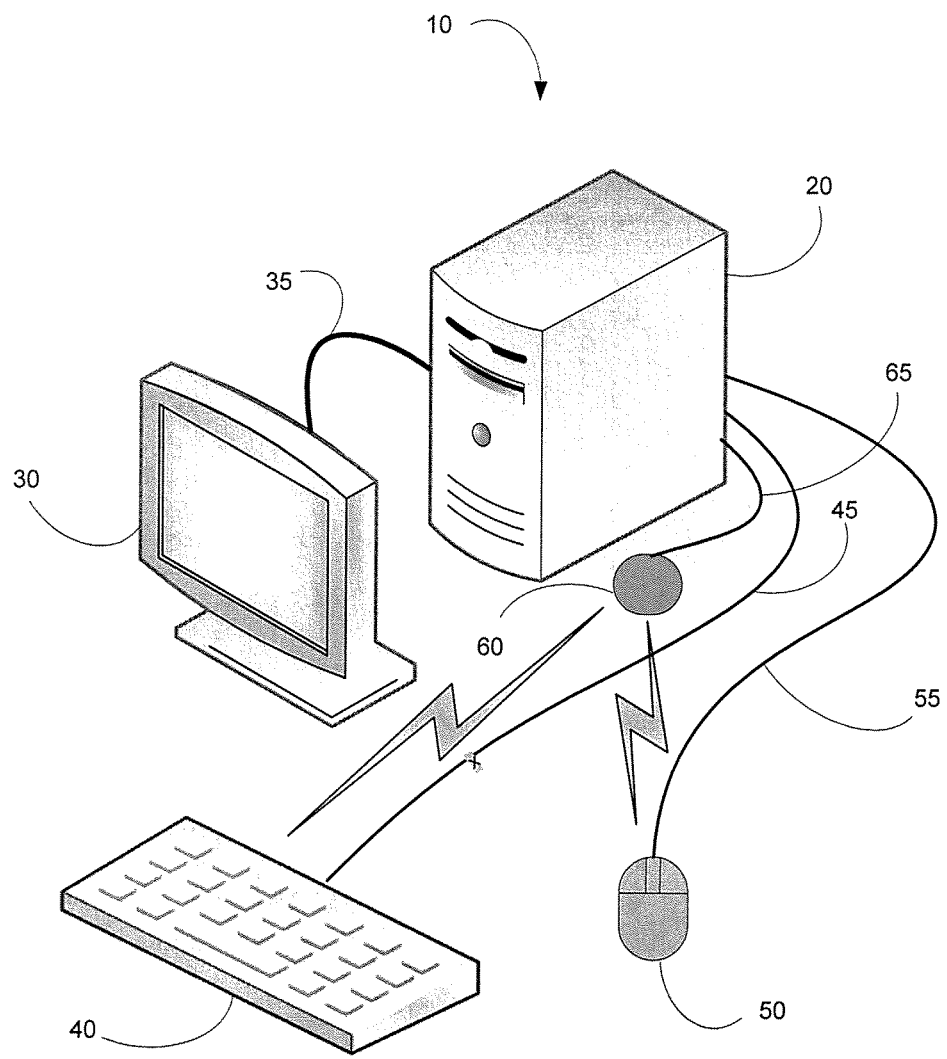
FIG. 1 is a schematic view of an illustrative embodiment of a computer system.

FIG. 1 illustrates a computer system 10. As is common, the computer system 10 includes a computer housing 20 coupled to a display 30 by a display cable 35. As can be appreciated, the computer housing 20 and the display 30 can be combined in a single unit. To provide user input to the computer housing 20, a keyboard 40 is coupled to the computer housing by a keyboard cable 45. To provide the user additional input functionality, a mouse 50 is coupled to the computer housing 20 via a mouse cable 55. As is known, the input devices (e.g., keyboard and mouse) may be alternatively configured to provide signals in a wireless manner and the cables connecting the keyboard 40 and the mouse 50 to the computer housing 20 may be omitted. In an embodiment the keyboard 40 and mouse 50 may transmit signals directly to the computer housing 20 via any preferable RF protocol, such as, but not limited to, Bluetooth. While both ways of communicating are shown in FIG. 1, however it is recognized that typically only one method would be used.

In an alternative embodiment, the keyboard 40 and mouse 50 may wirelessly transmit the signals to a receiver module 60 that is configured to receive the signals. The receiver module 60, which may be directly coupled to the computer housing 20, may also transmit the received signals to the computer housing 20 via a receiver cable 65.

As can be appreciated, a possible advantage of using the receiver module 60 is that the keyboard 40 and mouse 50 can be positioned close to the receiver module without the need for a bulky computer case 20 to be close to the keyboard 40 and mouse 50.

The receiver module 60 allows for the use of any desirable RF protocol and, if positioned close enough, can also allows the keyboard 40 and mouse 50 to transmit signals at a lower power level. In addition, if the computer housing 20 is not configured to receive the chosen protocol, the use of the receiver module 60 allows the input devices to function without the need to modify the computer housing 20.

Figure 2:
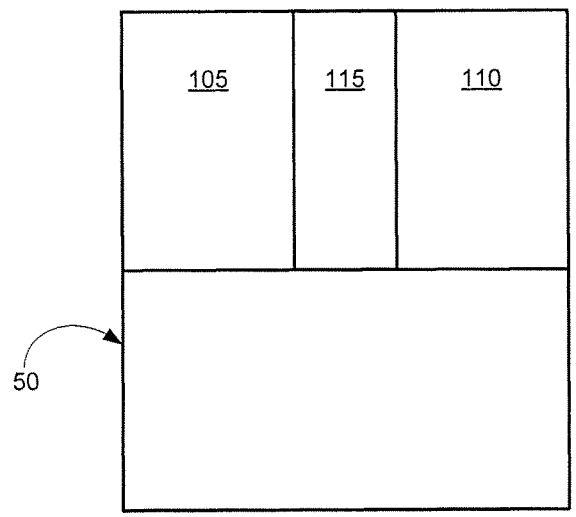
FIG. 2 is a simplified schematic view of an illustrative embodiment of a computer mouse.

The computer mouse 50, as depicted in the schematic illustration of FIG. 2, can be configured to include a left input element 105, a right input element 110 and a middle input element 115 positioned between the left and right inputs elements 105, 110. In an embodiment, the left and right inputs elements may be provided by two buttons that may be depressed and when depressed, engage a responsive element such as a switch. The middle input element 115 may be provided by known components such as a scroll wheel or a touchpad unit with a contact surface that senses movement of a user's finger across the contact surface. An advantage of using a touchpad unit is that it can be encapsulated more readily so as to be made waterproof.

As can be appreciated, a waterproof computer mouse is useful because it allows a user to easily clean the computer mouse. If the touchpad unit is waterproof, then the computer mouse can be configured so that it can be submerged in water and in an embodiment the computer mouse may even be safely run through a dishwasher cycle with little or no caution taken by the user.

Figure 3:
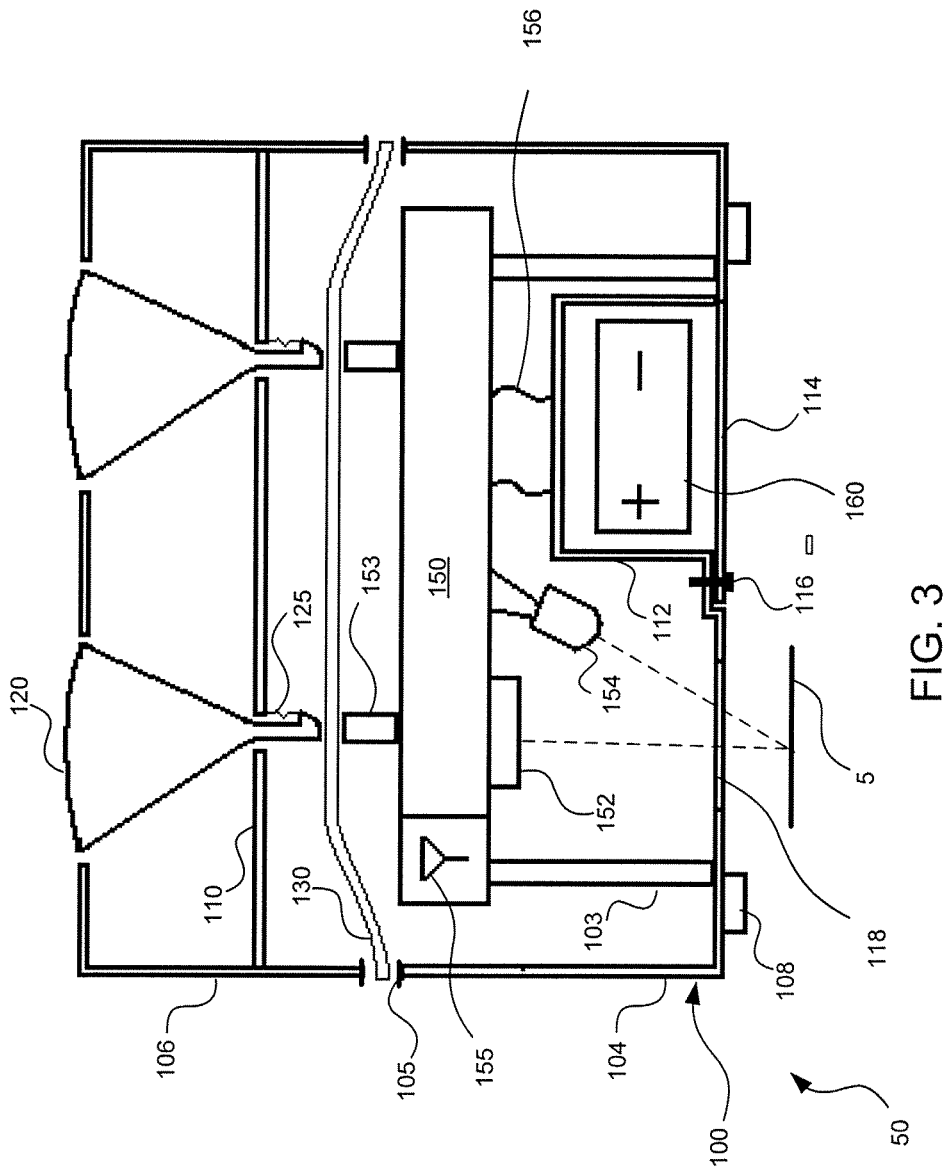
FIG. 3 is a schematic cross section of an illustrative embodiment of a computer mouse configured for wireless operation.

FIG. 3 illustrates details of an embodiment of a computer mouse 50. A housing 100 includes a lower portion 104 and an upper portion 106. Skid plates 108 are provided on the lower portion 104 as an aid to provide a lower friction when moving the mouse 50 around. Two buttons 120 are supported by support 110 of the upper portion 106 and a biasing element 125 is configured to urge the buttons 120 to an initial non-depressed position (as shown). In one arrangement, the biasing element 125 is a spring suspended from the support 110. However, any desired form of biasing element may be used.

In operation, depressing one the buttons 120 can cause it to engage a responsive element 153 that is coupled to a mouse circuitry 150. As is known, the mouse circuitry 150, which may be provided on a printed circuit board (PCB), is configured to convert the actuation of the responsive element 153 caused by the button press into a digital signal. To detect translational movement of the mouse 50 relative to a supporting surface 5, a light source 154 emits a light that passes through the lower portion 104 and is reflected off the surface supporting 5 back to the sensor 152 in the computer mouse 50. Movement of the computer mouse 50 creates patterns of reflected light and a sensor 152 is provided to detect the reflected patterns of light off the surface supporting the computer mouse 50. The sensor 152 may be a complimentary metal-oxide semiconductor (CMOS) or any other desirable type of sensor. The sensor 152 may be coupled to a digital signal processor (DSP) that processes the detected patterns so that the speed and direction of movement of the mouse may be determined. The light source 154 may be, for example, a light emitting diode (LED) or a laser. To provide a pathway for the light emitted from the light source 154 and also for the light reflected off the surface supporting the mouse, an optical port 118 is provided. The optical port is a transparent area in the housing that allows light to pass through housing, reflect of a support surface 105 and be reflected back through the housing 100 to the sensor 152. In an embodiment, a LED based light source 154 and an associated sensor 152 can be used with a sufficiently translucent material for the lower portion 104 because the patterns of light can be detected through the translucent material. Therefore, in an embodiment, a translucent material may be used for the lower portion 104. An advantage of such a configuration is the elimination of a separate optical port because the optical port is integral with the lower portion 104.

In an alternative embodiment, the optical port 118 may be a separate component that is fastened to the lower portion 104 via an adhesive, overmolding process, RF welding or any other desirable fastening process. An advantage of such a configuration is that the optical port 118 can be made of a separate material with different optical qualities than the housing 100 and/or the lower portion 104 without substantially increasing the cost of the remainder of the housing 100. In an embodiment, the optical port 118 can be used with a laser based light source 154 so as to provide a computer mouse 50 that includes the advantages of using a laser as the light source 154.

Figure 9:
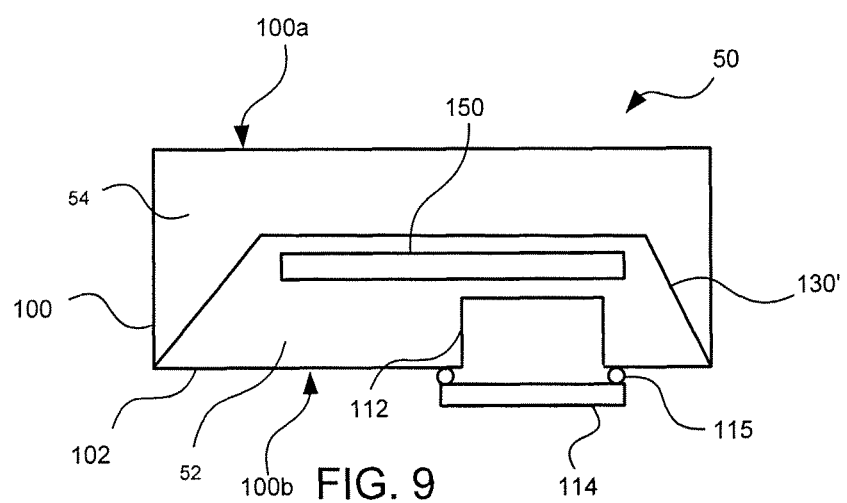
FIG. 9 is a schematic simplified cross-section of an embodiment of an illustrative computer mouse.

To power the mouse circuitry 150, a power source 160 may be provided. The power source 160 may be positioned in a compartment 112 and may be covered by a door 114 that removable attaches to the lower portion 104 in a sealable fashion via one or more fasteners 116. The door 114 may be sealed to the lower portion 104 via gaskets or O-rings such as is shown in FIG. 9. Electrical power may be provided to the mouse circuitry 150 via wires 156.

Figure 7:
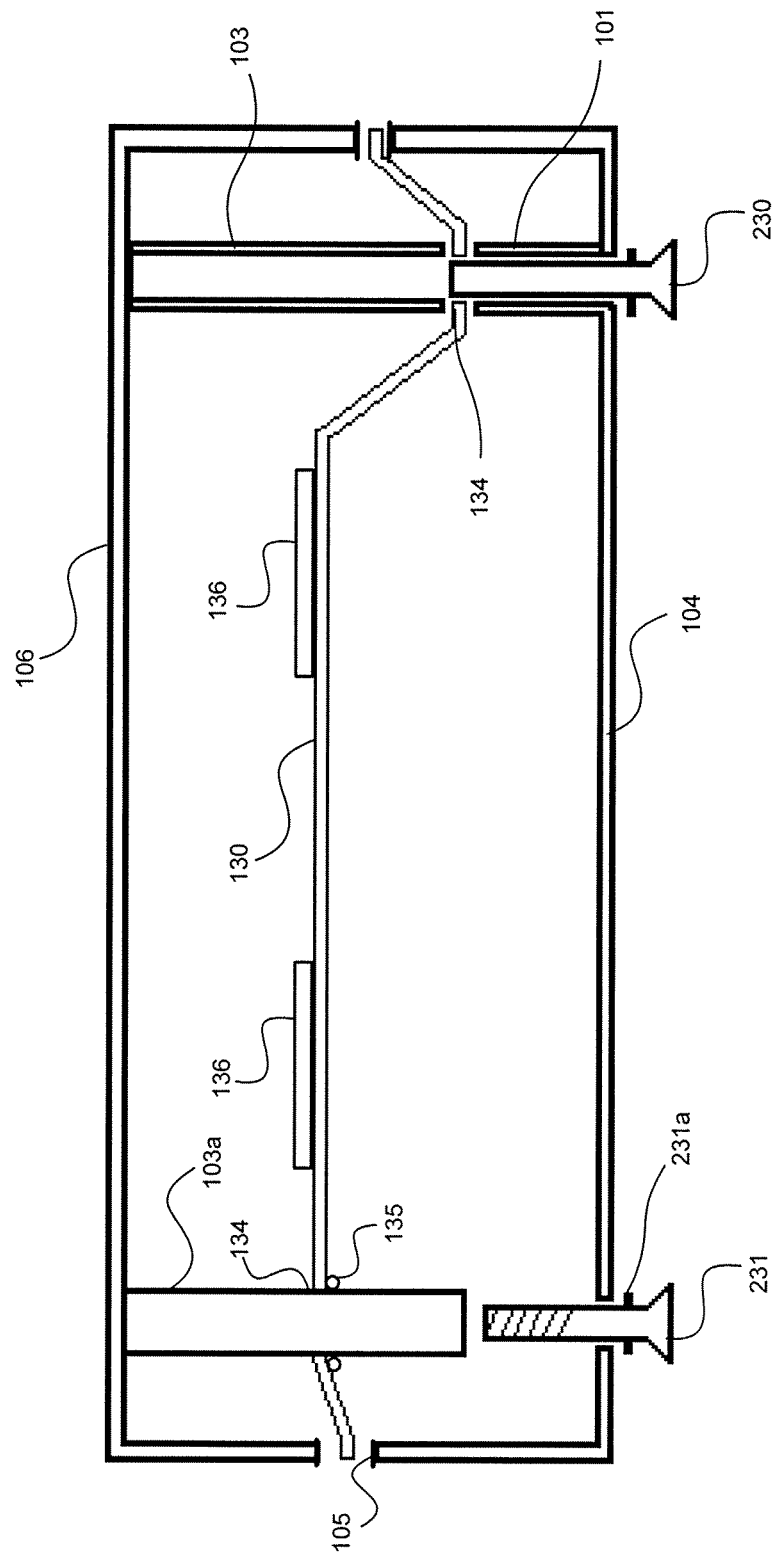
FIG. 7 is a schematic simplified cross section of a computer mouse.

As can be appreciated, the lower portion 104 is configured so as to be sealed against the ingression of liquids such as water. To protect the various conductors and circuitry supported by the lower portion 104, a substantially water impermeable barrier layer 130 is sealed to a sealing surface 105, which may be a lip or shoulder or any other desirable shape, of the lower portion 104. The barrier layer 130 may be a material with a low durometer and may have variable surface contours and a variable wall thickness. In an embodiment, one or more fasteners may be used to compress the barrier layer 130 between the lower portion 104 and the upper portion 106. For example, FIG. 7 illustrates two examples of how the upper and lower portion may be held together. In an embodiment depicted on the left side of FIG. 7, a member 103a may extend through an aperture 134 in the barrier layer 130 and a fastener 231, which may include a seal 231a, may be configured to engage the member 103a. While the member 103a may be sealed to the barrier layer 130 in any desirable manner, in an embodiment a seal 135 may be used to seal the barrier layer 130 to the member 103a. In an alternative embodiment, as depicted on the right side of FIG. 7, the aperture 134 may be configured so as to be compressed between two opposing members 101 and 103 and a fastener 230 may extend through the aperture 134.

It should be noted that the barrier layer 130 may be made of silicone and may be molded so as to provide the desired shape. The barrier layer may also include one or more wear plates 136 which allow the buttons 120 to be pressed down without wearing out the barrier layer 130. The wear plates 136, if provided, may be attached to the barrier layer 130 via an adhesive, an overmolding, a RF welding or by any other desirable fastening process.

Figure 8B:
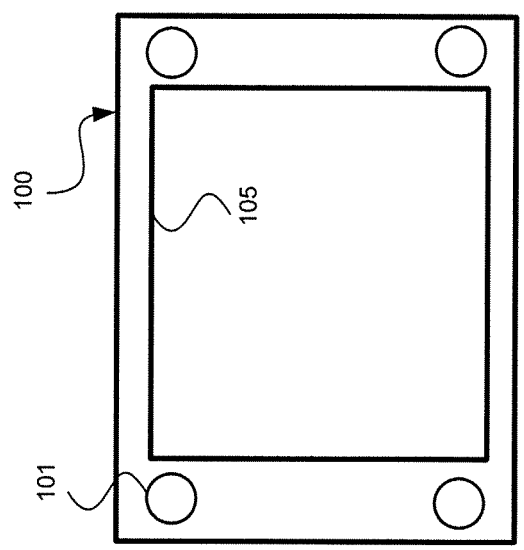
FIG. 8a-8b are simplified top views of a lower portion of a housing.
Figure 8A:
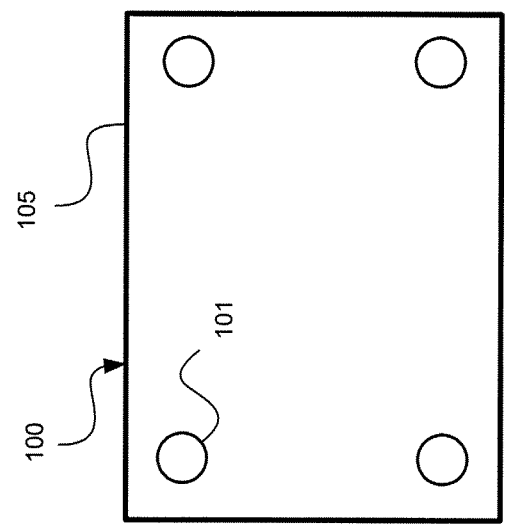

The fastening mechanism for holding the upper and lower portions 104, 106 together is shown being positioned inside the sealing surface 105 in FIG. 7, just as it is in FIG. 8a. In an alternative embodiment, the member 103 may be positioned outside of the sealing surface 105, as is depicted in FIG. 8b. While the embodiment depicted in FIG. 8b has the advantage of not requiring the member 103 to seal to the barrier layer 130, the embodiment depicted in FIG. 8a has the advantage of, for a given sized housing 100, providing a greater volume of space enclosed in a sealing pocket formed by the barrier layer 130 and the lower portion 104. The additional space can be useful for packaging the mouse circuitry in a smaller or more sleek housing 100.

The computer mouse 50 depicted in FIG. 3 also includes an antenna 155, therefore the mouse circuitry 150 may transmit digital signals to a receiver, such as the receiver module 60. In such a configuration, the computer mouse 50 may be placed entirely into a cleaning solution with the need to prepare the mouse. Thus, the computer mouse 50 may go from use with a computer to being placed directly into a cleaning solution without any special care being required and if materials are chosen that are stable at the temperatures experienced in dishwasher, the computer mouse 50 may also be also be placed directly into a dishwasher. It should be noted that as water is likely to enter the upper portion 106, the biasing element 125 may be molded as a dome shaped feature in the barrier layer 130 because it is expected that the barrier layer 130 is potentially more resistant to exposure to water than a spring.

Figure 4:
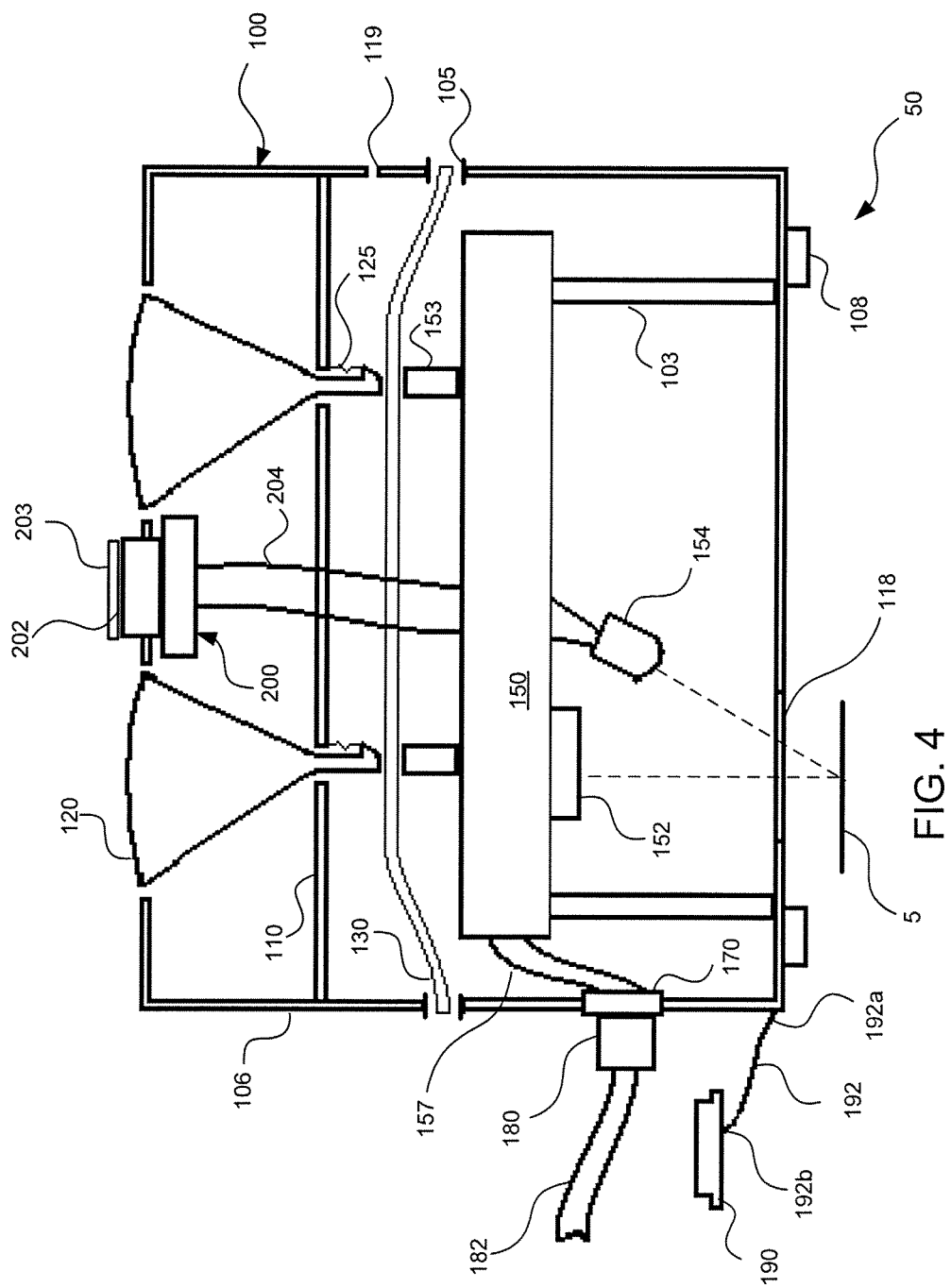
FIG. 4 is a schematic cross section of an illustrative embodiment of a computer mouse configured for wired operation.

FIG. 4 illustrates an alternative embodiment of a computer mouse 50. A connector 170 is coupled to the mouse circuitry via wires 157 and extends beyond the housing. The connector 170 is configured to accept a mating connector 180 on a cable 182 and is somewhat exposed to the environment outside the housing 100. A computer mouse 50 having a fixed mouse cable 55 is susceptible to being damaged if placed in a dishwasher because the mouse cable 55 may become wound up in the dishwasher mechanism, potentially damaging the cable and/or the dishwasher mechanism. Therefore, the mating connector 180 of cable 182 may be disengaged from the connector 170 and a plug 190, which may be made of a flexible plastic material, may be inserted into the connector 170 so as to protect the connector from environmental damage.

To secure and prevent the plug 190 from becoming lost, the plug 190 may be attached to the lower portion 104 via a clip (not shown). In an alternative embodiment, the plug 190 may be attached to the housing 100 via a tether 192 having a first end 192a mounted to the housing and a second end 192b mounted to the plug. In an embodiment, the housing may also include a recess (not shown) for supporting the plug 190 while the plug is not otherwise in use. While the tether 192 is depicted as being attached below the connector 170, in an embodiment the tether 192 may be attached to the housing 100 above the connector 170 so that the plug 190 does not catch or otherwise prevent the computer mouse 50 from smoothly sliding over the surface that the computer mouse 50 is resting upon. The tether 192 may be coupled to the plug 190 and the housing 100 in any desirable manner, including but not limited to being molded to, RF welded to or adhered to with an adhesive.

In an embodiment, the cable 182 may be configured to transmit digital signals from the mouse circuitry 150 and to also provide power to the mouse circuitry 150. In an embodiment, the connector 170 may be configured for use with a Universal Serial Bus (USB) cable.

To provide a scrolling input 115, a touchpad unit 200 is positioned so that a contact surface 202 is positioned between two buttons 120. In an embodiment, the contact surface 202 may be covered with a protective coat 203. The contact surface 202 may be any type of surface sensitive to pressing, such as, without limitation, a resistive touch screen. The touchpad unit 200 may be enclosed in a water impermeable layer and/or may be coated with epoxy (e.g. potted) or otherwise protected from water in a known manner. Insulated leads 204 may be provided to provide power to the touchpad and to provide signals to the mouse circuitry 150. The leads 204, which may also be a ribbon cable, may be sealed to the barrier layer 130 in any desirable manner including, but not limited to, an adhesive seal or an interference fit.

As can be appreciated, features of FIGS. 3 and 4 can be combined and/or omitted as desired to provide an appropriate configuration. For example, a computer mouse 50 could include a touchpad unit and also be wireless.

Figure 5:
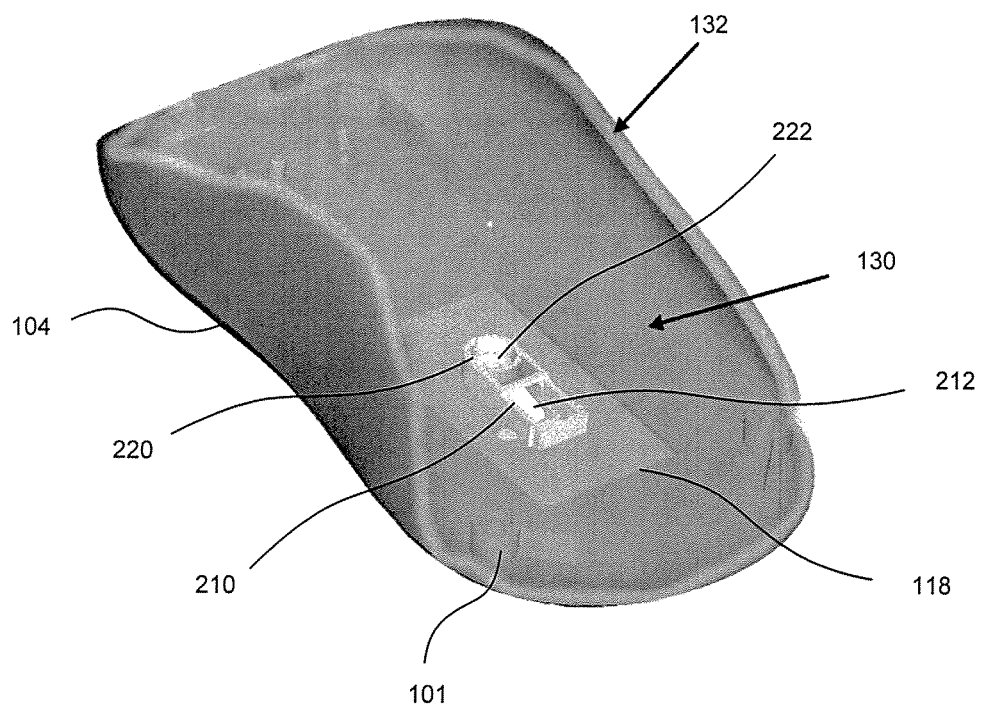
FIG. 5 is a partial isometric view of an exemplary computer mouse housing.
Figure 6:
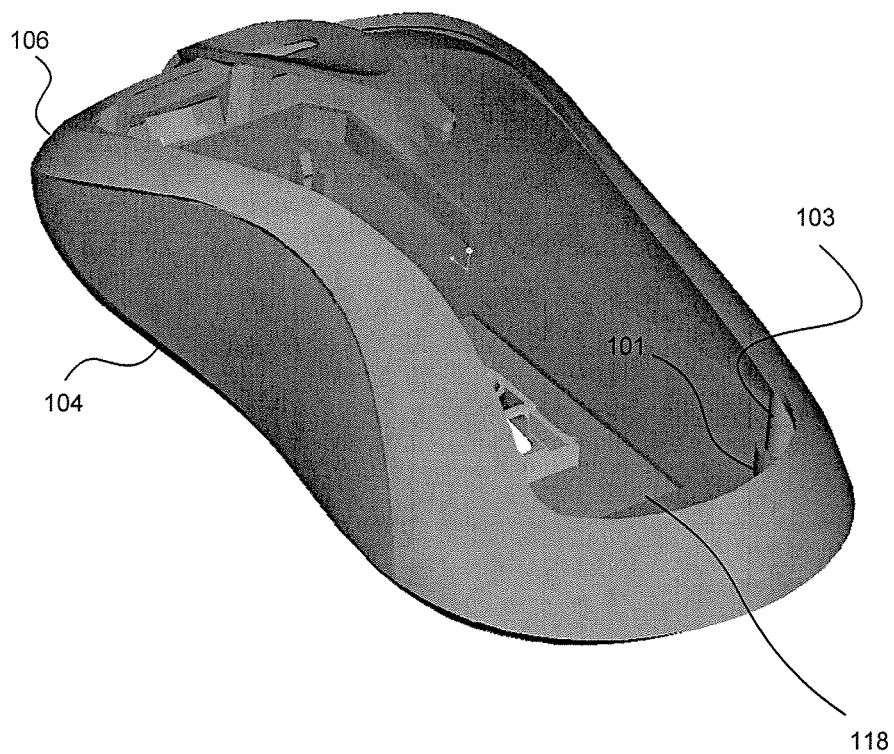
FIG. 6 is another partial isometric view of an exemplary computer mouse housing.

It should be noted that any desirable shape may be used. For example, a curved, ergonomic and aesthetic shape such as depicted in FIGS. 5 and 6 may be provided. As depicted, the barrier layer fits between the lower portion 104 and the upper portion 106 and a sealing portion 132 of the barrier layer 130 is sealed to the power portion 104. In an embodiment, the barrier layer 130 may be sealed to the housing 100 through the use of an adhesive or other desirable means such as sonic welding or the like. In an embodiment, the barrier layer 130 may be configured to provide an aperture 134 that aligns with the intersection of the member 101 and member 103. In an alternative embodiment, the barrier layer 130 may include an aperture 134 that is positioned on one of the member 101 and member 103 and sealed thereto by any desirable means such as an adhesive or interference fit (in a manner similar to the sealing of the barrier layer 130 to member 103a in FIG. 7).

As previously noted, the light source 154 may be a laser. In such an embodiment, a first passageway 210 may provide a substantially transparent cover 212 to allow the light from the laser to be directed on the support surface 5. A second passageway 220 may include a second substantially transparent cover 222 to allow reflected light to be directed to the sensor 152. To provide superior performance, one or both covers may be an optical grade plastic such as polycarbonate. As can be appreciated, the second cover 222 may be a lens configured to help focus and direct the reflected light unto another lens and/or the sensor 152.

Turning to FIG. 9, a computer mouse 50 includes a housing 100 that has a first water impermeable region 52 and a second water permeable region 54. To form the water impermeable region 52, a water impermeable layer 130' is sealed to the housing 100, which includes a top 100a and a bottom 100b. Thus, the water impermeable layer 130' and the housing 100 prevent water from entering the water impermeable region 52, which is on a first side of the water impermeable layer 130', while water can enter the water permeable region 54, which is on a second side of the water impermeable layer 130'. Mouse circuitry 150, which may include features as discussed above, is positioned in the water impermeable region 52. It should be noted that the water impermeable layer 130' may be configured as desired and in an embodiment the water impermeable layer 130' may be molded in bubble like shape and mounted to a base of the housing 100. It should be noted that if the housing 100 includes a compartment 112 that may be used to support a power source, a door 114 may be sealed to the base 102 by a gasket 115. In operation, one or more input elements, such as a button 120, can interact with the mouse circuitry 150 to generate a signal. Thus, the input element can be positioned in the water permeable region 54 while the responsive element, which may be a switch or any type of desirable element configured to detect a button press, is on the water impermeable side. This allows the computer mouse 50 to be washed without damaging the mouse circuitry 150 while not requiring the entire housing 100 to be water impermeable.

After a period of use it is expected that mouse will become dirty and/or less sanitary, due to exposure to dirt and germs and expected environmental factors such as dust and suspended particulates. Therefore, it may be desirable to clean the computer mouse. If the mouse is wireless, then the mouse may be placed in a water solution or placed in the dishwasher and be cleaned. The water may enter the water permeable region but will not enter the water impermeable region. If the computer mouse is coupled to the computer system by a cable, the cable can be removed. The plug, which may be mounted in a recess (not shown) configured to store the plug while the plug is not in use, may then be installed into the exposed connector. The computer mouse may then be safely washed as discussed above. As before, the water may enter the permeable region but the water cannot enter the water impermeable region and the plug prevents damage to the exposed external connector.

If water remains in the upper portion after the washing is complete, the mouse can be tilted so the water is allowed to drain. In an embodiment, the water may be allowed to drain out of a drain hole 119. Any remaining water drops after the water drains from the water permeable region will dry in due course.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Numerous other embodiments, modifications and variations within the scope and spirit of the appended claims will occur to persons of ordinary skill in the art from a review of this disclosure.

I claim:

1. A computer mouse, comprising:
a housing including an upper portion and a lower portion with a sealing surface and an optical port;

mouse circuitry including a sensor, a light source and a responsive element, the mouse circuitry supported by the lower portion;
a connector coupled to the mouse circuitry via wires and extending beyond the housing, the connector configured to accept a mating connector on a cable, the mating connector being removable from the connector;
a plug constructed from a flexible plastic material, the plug configured to be sealably inserted in the connector when the mating connector is removed from the connector, the plug configured to protect the connector from environmental damage;
a button coupled to the upper portion and configured to press on the responsive element;
a barrier layer sealably mounted to the sealing surface, the barrier layer extending between the button and the mouse circuitry, wherein the barrier layer and the lower portion form a sealed pocket; and
a wear plate attached to the barrier layer, the wear plate protecting the barrier layer from contact with the button.

2. The computer mouse of claim 1, wherein the mouse circuitry is configured is configured to transmit wireless signals.

3. The computer mouse of claim 2, further comprising a compartment for holding, in operation, a power source, wherein the lower portion further includes a removable door configured to sealably cover the compartment.

4. The computer mouse of claim 1, further comprising a tether having a first end coupled to the housing and a second end coupled to the plug.

5. The computer mouse of claim 1, wherein the lower portion includes a separate sealed optical port with a least one passageway with an optical cover and the light source is a laser.

6. The computer mouse of claim 1, wherein the entire lower portion is translucent and the optical port is integral to the lower portion.

7. The computer mouse of claim 1, wherein the barrier layer includes an aperture and the housing comprises a member extending through the aperture in the barrier layer, the member configured to accept a fastener so as to hold the upper and lower portions together, wherein the member is sealably coupled to an area surrounding the aperture in the barrier layer.

8. A computer mouse, comprising:
a housing, including a lower portion and an upper portion, the lower portion including a bottom portion and two vertically-curved sides that extend from the bottom portion at differing heights, the upper portion fitting over the vertically-curved sides of the lower portion;
a water impermeable layer sealably mounted to the housing, the water impermeable layer including a first side and a second side;
mouse circuitry including a sensor, a light source and a responsive element positioned in housing on the first side of the water impermeable layer;
a connector coupled to the mouse circuitry via wires and extending beyond the housing, the connector configured to accept a mating connector on a cable, the mating connector being removable from the connector;
a plug constructed from a flexible plastic material, the plug configured to be sealably inserted in the connector when the mating connector is removed from the connector, the plug configured to protect the connector from environmental damage;
a button for actuating the response element supported by the and positioned on the second side;
a wear plate attached to the second side of the water impermeable layer, the button making contact with the wear plate when the button is pressed down; and
an optical port sealably coupled to the housing on the first side of the water impermeable layer.

9. The computer mouse of claim 8, further comprising a drain hole in the housing on the second side of the water impermeable layer.

10. The computer mouse of claim 8, wherein the optical port includes a first passageway including a first optical cover and a second passageway including a second optical cover and the light source is a laser.

11. The computer mouse of claim 8, wherein the housing includes a top and bottom and the water impermeable layer is sealably mounted to the housing between the top and bottom.

12. The computer mouse of claim 8, further comprising a sealed touchpad unit positioned on the second side of the water impermeable layer, the touchpad unit configured for sealed communication with the mouse circuitry on the first side of the water impermeable layer.

13. The computer mouse of claim 8, where the water impermeable layer comprises molded silicone.

14. A computer mouse, comprising:
a housing including a water impermeable region and a water permeable region;
mouse circuitry including a sensor, a light source and a first and a second response element mounted in the water impermeable region;
a connector coupled to the mouse circuitry via wires and extending beyond the housing, the connector configured to accept a mating connector on a cable, the mating connector being removable from the connector;
a plug constructed from a flexible plastic material, the plug configured to be sealably inserted in the connector when the mating connector is removed from the connector, the plug configured to protect the connector from environmental damage;
a first and a second button mounted in the water permeable region and configured to respectively actuate the first and second responsive elements;
a molded barrier layer sealably mounted to the housing and separating the water impermeable region and the water permeable region;
a member extending through an aperture of the water impermeable region, the member configured to accept a fastener so as to hold the upper and lower portions together;
a separate seal that seals the member to the water impermeable layer;
a first and a second wear plate each attached to the barrier layer via an adhesive, an overmolding or a welding, the first wear plate positioned below the first button and the second wear plate positioned below the second button, the first and second wear plates preventing the first and second buttons from making contact with the barrier layer to minimize wear of the barrier layer; and
a sealed touchpad unit mounted in the water permeable region, the sealed touchpad unit including a contact surface being positioned substantially between the first and second buttons, the sealed touchpad-unit in sealed communication with the mouse circuitry in the water impermeable region.

15. The input device of claim 14, wherein the mouse circuitry is configured to transmit signals wirelessly.

16. The input device of claim 14, wherein the water permeable region includes a drain hole.

17. The input device of claim 14, further comprising:

a compartment in the water impermeable region configured to support a power source;
a removable door mounted to the housing and configured to cover the compartment; and
a gasket configured to seal the removable door to the housing.

* * * * *